United States Patent [19]

Beaulieu

[11] Patent Number: 5,624,200
[45] Date of Patent: Apr. 29, 1997

[54] PANEL FASTENER AND SPACE FRAME HUB

[75] Inventor: Bryan J. Beaulieu, Burnsville, Minn.

[73] Assignee: Skyline Displays, Inc., Burnsville, Minn.

[21] Appl. No.: 643,015

[22] Filed: May 2, 1996

[51] Int. Cl.$^6$ ............................................. F16B 12/02
[52] U.S. Cl. ................... 403/217; 403/218; 403/174; 403/316; 248/222.52; 248/223.41
[58] Field of Search ...................... 403/217, 218, 403/219, 170, 169, 174, 175, 178, 315, 316, DIG. 10; 52/126.5, 126.6, 36.4; 135/909, 153, 152, 151, 157; 160/135, 351; 248/316.5, 222.52, 223.41

[56] References Cited

U.S. PATENT DOCUMENTS

| | | | |
|---|---|---|---|
| 3,809,142 | 5/1974 | Bleeker | 160/135 |
| 3,971,182 | 7/1976 | Donahue et al. | 160/135 X |
| 4,104,838 | 8/1978 | Hage et al. | 160/135 X |
| 5,302,039 | 4/1994 | Omholt | 403/218 |
| 5,333,423 | 8/1994 | Propst | 52/126.6 |

FOREIGN PATENT DOCUMENTS 722310  5/1942  Germany ........................... 403/218

Primary Examiner—Kenneth J. Dorner
Assistant Examiner—William L. Miller
Attorney, Agent, or Firm—Palmatier, Sjoquist, Helget & Voigt, P.A.

[57] ABSTRACT

A panel fastener and space frame hub adapted for releasably holding panel sections in place against the space frame hub. The space frame hub has threadable connections for receiving space frame struts so as to permit the construction of a frame of any desired shape or size. Each panel section used with the invention has respective panel brackets at each of its corners, the panel brackets being complementary shaped to engage with a rotatable keyed plate on the fastener. They Keyed plate may be rotated to align a key cutout with a complementary shaped key in the respective panel brackets and may then be rotated to lock the panel bracket in place against the keyed plate.

13 Claims, 2 Drawing Sheets

5,624,200

PANEL FASTENER AND SPACE FRAME HUB

BACKGROUND OF THE INVENTION

The present invention relates to a fastening device for securing panel sections together; more particularly, the invention relates to a fastening device for securing panels against a supporting frame of a particular construction.

The invention finds particular utility in the field of portable exhibit displays of the type generally associated with trade shows, exhibits, and retail and commercial displays. These displays are typically set up to provide a fairly large display surface containing graphics and/or printed material for the purpose of promoting and advertising a particular product or service. In the trade show industry, it is preferable that such displays be made easy to assemble and disassemble and be capable of being carried in portable display cases from place to place.

In any application where the display is not intended to become a permanent fixture at a particular location, it is desirous to provide ease of assembly and disassembly. At the same time, care must be taken to provide the necessary structural strength for such displays; and in the case of very large displays, the strength of the supporting structure and frame becomes a very important factor. Such structures typically have a panel display surface affixed to a supporting frame, wherein the panel display surface is formed in sections, and the sections are individually attachable to the frame structure. The frame structure itself is also typically formed in sections or in a folding or collapsible construction. Alternatively, the supporting frame may be made from an assemblage of component parts which can be easily engaged to construct the frame and disconnected when the frame is to be broken down for storage and/or transport.

SUMMARY OF THE INVENTION

A panel fastener for attachment at the intersection of a plurality of flat or curved panel sections and for attachment to a plurality of struts or tubular space frame members for structural rigidity. The fastener utilizes a generally spherical hub which has a plurality of threaded openings about its circumference and an orthogonal pair of openings for securing a panel attachment plate. The panel attachment plate comprises a rotatable turntable having a keyed end cap which is complementary shaped to a panel bracket which may be affixed at the respective corners of panels. The keyed end cap may be rotatably engaged and locked to secure the panel corner against the turntable plate and up to three additional panels may be similarly secured with the fastener being positioned at the intersection of the respective panel edges.

It is a principal object of the present invention to provide a panel fastening device for permitting easy engagement and disengagement to panel sections.

It is another object and advantage of the present invention to provide a panel fastening device having means for connecting to a suitable space frame for supporting the panels.

It is yet another advantage and object of the present invention to provide a panel fastener which may be operated by a simple tool insertable at the intersection of the respective panel sections.

Other and further objects and advantages of the present invention will become apparent from the following description and claims and with reference to the appended drawings.

DESCRIPTION OF THE PREFERRED EMBODIMENT

Figure 1:
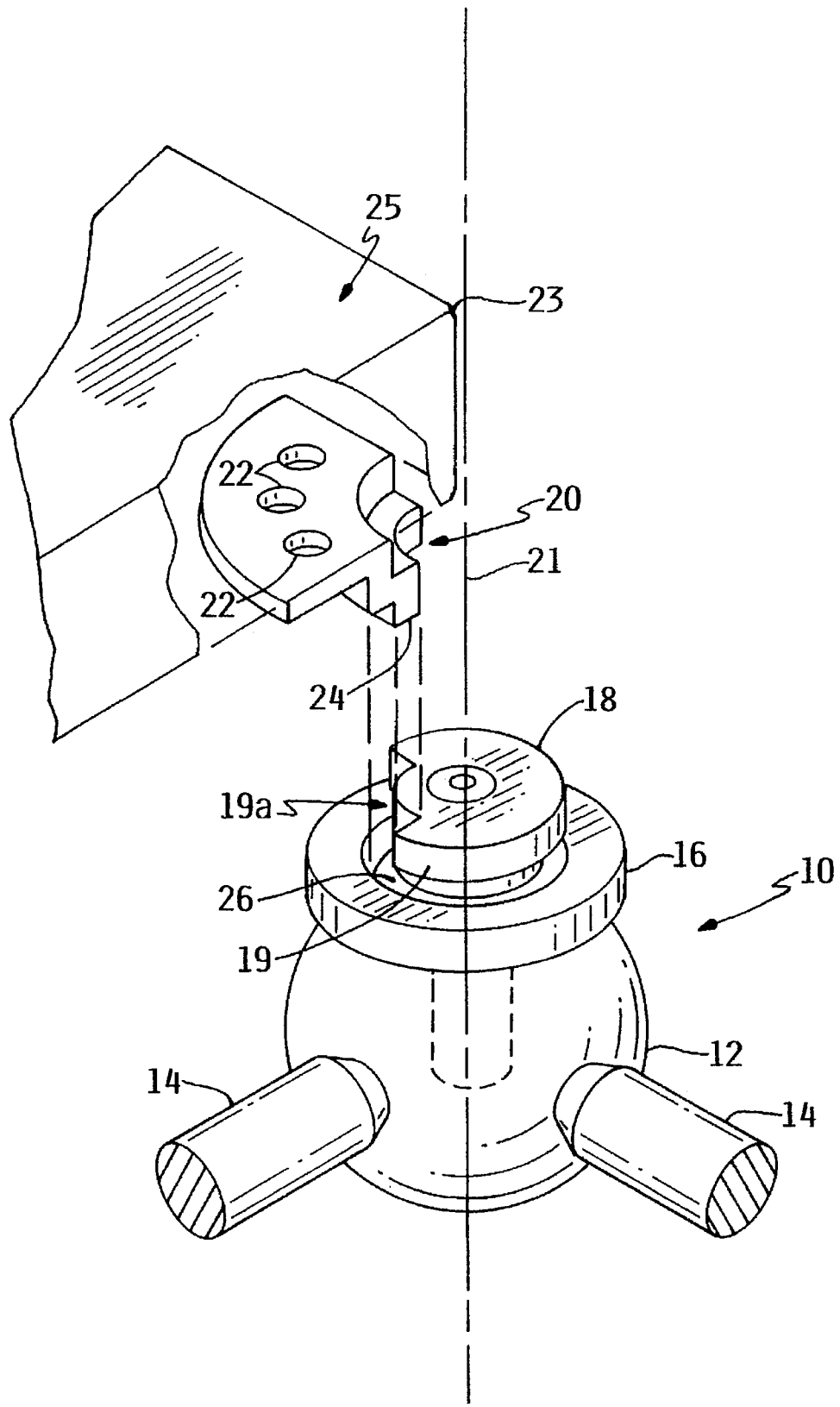
FIG. 1 shows an isometric view of the present invention, including the panel bracket.

Referring first to FIG. 1, the invention is shown in isometric view, with the corner of a panel section 25 being aligned along the axis 21 of fastener 10. A panel bracket 20 having a general semicircular form is affixed to the underside of panel section 25 by a plurality of fasteners (not shown) which are connected to the panel section 25 through openings 22. It is important that the corner or panel section 25 have a slight bevel 23 in order to create a small amount of clearance between the beveled edge 23 and the axis 21 of fastener 10. When four such panels are placed together to form a common intersecting corner, the respective bevels 23 will provide a small opening to allow access for a tool to be hereinafter described.

Fastener 10 comprises a generally spherical hub 12 having a plurality of threaded openings 13 arranged about a circumference. One or more space frame struts 14 having threaded ends may be secured into the threaded openings to provide the structural rigidity and strength for the display and frame. The circumference about which the threaded openings are formed is preferably orthogonal to axis 21.

A plate 16 and keyed rotatable plate 18 are attached to space frame hub 12 in alignment with axis 21. Keyed plate 18 has an outwardly extending shoulder 19 which is spaced upwardly and apart from turntable plate 16. Shoulder 19 has a key cutout 19a of a unique configuration and which is complementary shaped to the downwardly depending tab 24 which forms a part of panel bracket 20. Downwardly depending tab 24 is sized to fit within the circular slot 26 of turntable plate 16, as is shown in dotted outline in FIG. 1. Turntable plate 16 and keyed plate 18 may be formed from a single part or may be constructed as two individual parts, either separately or subsequently adhered together. The materials used to make plate 16 and plate 18 may be plastic materials.

Figure 2:
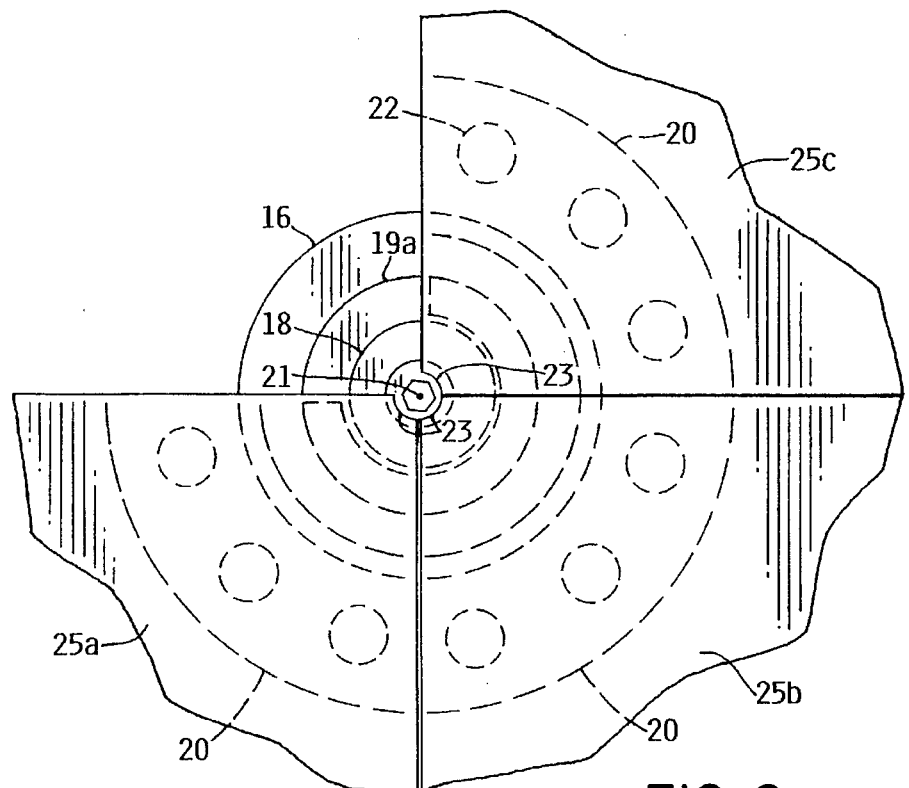
FIG. 2 shows a top plan view of the invention secured to three panel sections.

FIG. 2 shows a top plan view of three panel sections 25a, 25b, and 25c, having their respective intersecting beveled corners aligned with axis 21. Keyed plate 18 is shown with its shoulder 19 positioned so as to align key cutout 19a with the quadrant where no panel section is illustrated. Keyed plate 18 may be rotatably positionable about axis 21 so as to rotate key cutout 19a into any position relative to the respective panel sections. More or fewer panel sections could intersect at axis 21, depending upon the particular shapes selected for the panel sections.

Figure 3:
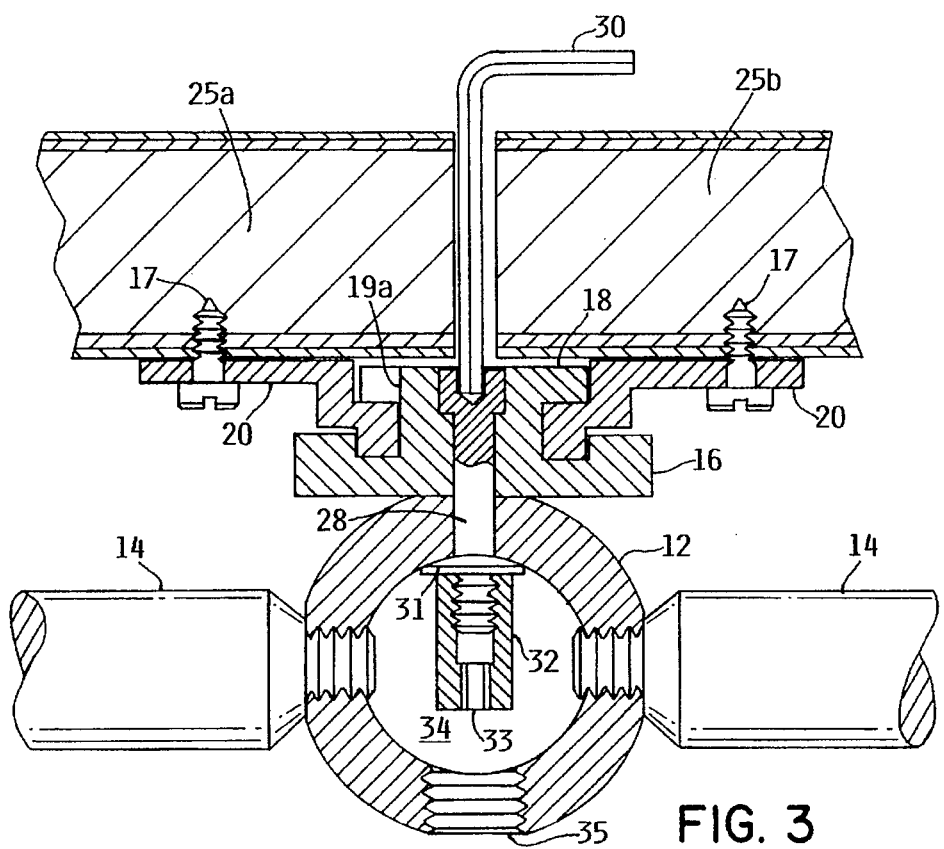
FIG. 3 shows a partial cross section of the invention and representative panel sections.

FIG. 3 shows a partial cross-section view of the invention attached to a pair of panel sections 25a and 25b. For illustration, an Allen wrench 30 is shown inserted into operative position into the head of a cap screw 28; by turning Allen wrench 30, it is possible to rotate keyed plate 18 relative to space frame hub 12. Cap screw 28 is pressfit into keyed plate 18, so that the turning of cap screw 28 causes a corresponding rotation of keyed plate 18. Cap screw 28 is threadably secured into a socket nut 32 which is contained within the interior cavity 34 of space frame hub 12. A dish-shaped washer 31 is placed between the end of socket nut 32 and the inner spherical surface of space frame hub 12. Washer 31 provides a curved bearing surface to permit turning of cap screw 28 and socket nut 32 relative to frame hub 12. Of course, keyed plate 18 also turns with cap screw 28. A thread locking material is applied to the threads of socket nut 32 prior to attaching socket nut 32 to cap screw 28; after the socket nut 32 has been attached to cap screw 28 and sufficiently tightened down, the thread locking material will prevent any further rotation between these two components. Socket nut 32 has a hexagonal Allen-style opening 33 for tightening socket nut 32 against the interior surface of cavity 34.

Each of the panel sections 25a and 25b has a panel bracket 20 affixed thereto by fasteners 17. Each of the panel sections can be disengaged from contact with keyed plate 18 by rotating keyed plate 18 to align key cutout 19a with the complementary opening in panel bracket 20.

A number of different alternative fastening approaches could be used instead of the cap screw 28 and socket nut 32. For example, cap screw 28 could simply be a pin having a circumferential groove and a spring clip could be insertable through opening 35 to attach over the shaft of cap screw 28. Other forms of fasteners may be used, the principal requirement being that cap screw 28 securely resists any outward forces relative to space frame hub 12 and at the same time permits rotational turning of keyed plate 18. Alternatively, keyed plate 18 could be constructed as a steel plate with a socket cast into it.

In operation, the plurality of panel brackets 20 are affixed to respective corners of the various panel sections to be utilized in a display. A plurality of fasteners 10 are constructed by inserting socket nuts 32 through a bottom opening 35 in space frame hub 12. Each socket nut 32 is then threadably secured by a cap screw 28 which also passes through a keyed plate 18 and a turntable plate 16. A space frame assembly is constructed utilizing a plurality of fasteners 10 in combination with a plurality of space frame struts 14, with the respective turntable plates and keyed plates facing outwardly to receive panel sections. Each panel section may be affixed to fastener 10 by suitably turning an Allen wrench 30 so as to align they key cutout 19a with the complementary tab in a panel bracket 20, inserting the panel bracket 20 in the slot 26, and then turning the Allen wrench to confine the panel bracket 20 between keyed plate 18 and turntable plate 16. After all the panel sections have been attached in this manner, Allen wrench 30 may be rotated to any suitable position which does not align key cutout 19a with a corresponding cutout in one of the panel brackets 20. Any single panel section may be removed after attachment according to the above procedure by realigning the key cutout at each of its respective corners so as to permit the panel section to be lifted outwardly away from engagement with fastener 10. A new panel section may be inserted into the overall panel display by merely reversing the procedure, respectively aligning the corner fastener so as to receive the panel brackets at the respective panel section corners and then rotating keyed plate 18 so as to lock the panel bracket in place.

Panel sections may be triangular, or of any convenient polyhedron shape, thereby requiring the intersection of different numbers of panel sections. In such cases the principle of the invention still applies, i.e., the keyed plate 18 may be aligned to release a panel section or misaligned to secure a panel section.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A panel fastener and space frame hub, comprising:
   a) a hollow spherical hub having a plurality of threaded openings spaced about a circumference and diametrically opposite openings aligned along an axis normal to said circumference;
   b) a turntable plate attached to said hub by a fastener passing through one of said diametrically opposite openings, said fastener attached to a nut insertable through the other of said diametrically opposite openings; said turntable plate having a circular groove and a raised shoulder spaced above said groove, said shoulder having a keyed portion of unique shape; and
   c) a panel bracket having means for attachment to a corner of a panel section, said panel bracket having a downwardly depending curved shoulder sized for fitting in said groove and having a shape complementary to said keyed portion unique shape;
   whereby said turntable plate may be rotatably positioned to accept said panel bracket shoulder in said groove, and may be further rotatably positioned to lock said panel bracket shoulder in said groove.

2. The apparatus of claim 1, wherein said fastener further comprises an interference fit in said turntable plate and is rotatable in coincidence with said turntable plate.

3. The apparatus of claim 2, wherein said fastener further comprises a head having an engagement recess for receiving a tool.

4. The apparatus of claim 3, wherein said engagement recess is hexagonal and said tool is an Allen wrench.

5. The apparatus of claim 4, wherein said nut further comprises a hexagonal engagement recess.

6. The apparatus of claim 1, wherein said shoulder keyed portion encompasses at least a sixty degree portion of said shoulder.

7. The apparatus of claim 6, wherein said panel bracket further comprises a quarter-circular shape having a quarter-circular downwardly depending shoulder sized to fit into said groove.

8. A panel section fastener and space frame hub attachable to a plurality of space frame struts to form a frame assembly in combination with a further plurality of space frame hubs and struts, wherein each panel fastener and space frame hub comprises:
   a) a hollow spherical member having a pair of diametrically aligned openings therethrough;
   b) a turntable plate mounted to the outside of said spherical member, said plate having a flat lower surface facing said spherical member and an upper surface having a circular groove, and a raised circular shoulder positioned above said groove, said circular shoulder having a keyed cutout portion; and
   c) a bracket having an upper surface and means for attachment to a panel section, said bracket having a lower surface and downwardly depending circular shoulder segment, said shoulder segment having a curved portion sized to fit in said circular groove and said lower surface slidable over said turntable plate upper surface having said circular groove, whereby said bracket downwardly depending shoulder segment is complementary shaped to said cutout portion.

9. The apparatus of claim 8, further comprising a fastener having a head in interference fit relation to said turntable plate, said fastener passing through said turntable plate and one of said diametrically aligned openings, and a fastener nut in said hollow spherical member; whereby said fastener and said fastener nut comprise a mounting for said turntable plate.

10. The apparatus of claim 9, wherein said fastener further comprises the head having an engagement recess for receiving a tool.

11. The apparatus of claim 10, wherein said engagement recess is hexagonal and said tool is an Allen wrench.

12. The apparatus of claim 11, wherein said nut further comprises a hexagonal engagement recess.

13. The apparatus of claim 8, wherein said hollow spherical member further comprises a flat portion of its exterior surface adjacent said diametrically aligned openings.

* * * * *